UNITED STATES PATENT OFFICE.

JAMES H. STEBBINS, JR., OF NEW YORK, N. Y.

COLORING-MATTER OR DYE-STUFF.

SPECIFICATION forming part of Letters Patent No. 253,443, dated February 7, 1882.

Application filed December 31, 1881. (Specimens.)

*To all whom it may concern:*

Be it known that I, JAMES H. STEBBINS, Jr., a citizen of the United States, residing at New York, in the county and State of New York, have invented new and useful Improvements in Dye-Stuffs or Coloring-Matters, of which the following is a specification.

This invention relates to a blue dye-stuff or coloring-matter which is produced by the action of chloride of lime upon an alkaline mixture of dimethyl-paraphenylendiamine chloride and orthocresol, (from coal-tar cresol.)

In carrying out my invention I take ten pounds of nitroso-dimethylaniline chloride and dissolve it in five hundred pounds of water. This I then reduce in the ordinary way, (at a temperature of 50° centigrade,) with ten pounds of zinc-dust, to dimethyl-paraphenylendiamine. The dimethyl-paraphenylendiamine so obtained is filtered, in order to remove the zinc-dust, and the filtrate is treated with a solution composed of 10.8 pounds orthocresol, twenty-four pounds caustic-soda lye, (specific gravity 1.29,) and two hundred pounds of water. To this mixture I add, under constant stirring, a solution composed of 6.3 pounds chloride of lime in one hundred pounds of water. The coloring-matter is instantly formed and precipitates out in little crystalline blue leaflets. These I collect on a filter and wash them slightly with cold water, after which it is ready for use.

The coloring-matter appears as a dark-blue paste with coppery-bronze luster. It is soluble in alcohol and in hot water, and dyes wool mordanted with the usual alum or chrome mordants, at a temperature of about 150° Fahrenheit, with a Prussian-blue color.

Dilute hydrochloric acid and also oxalic acid almost decolorize the aqueous solution, while destroying the dye stuff. Potash added to its aqueous solution produces no perceptible change. Strong sulphuric acid dissolves a strongly-concentrated paste of the dye-stuff with a peacock blue color, while evolving an odor strongly smelling of cresol. This solution is rendered almost colorless by the addition of hot water.

I do not wish to confine myself to the proportions of the ingredients herein described, as they may be changed without departing from the principle of my invention.

What I claim as new, and desire to secure by Letters Patent, is—

The blue dye-stuff produced by the action of chloride of lime upon an alkaline mixture of dimethyl-paraphenylendiamine hydrochloride and orthocresol, substantially as set forth.

In testimony whereof I have hereunto set my hand and seal in the presence of two subscribing witnesses.

JAMES H. STEBBINS, JR. [L. S.]

Witnesses:
J. VAN SANTVOORD,
E. F. KASTENHUBER.